United States Patent [19]

Yoshiura

[11] Patent Number: 4,714,944

[45] Date of Patent: Dec. 22, 1987

[54] VARIABLE-MAGNIFICATION COPYING MACHINE WITH AUTOMATIC MAGNIFICATION

[75] Inventor: Syoichiro Yoshiura, Yamatokoriyama, Japan

[73] Assignee: Sharp Kabushiki Kaisha, Osaka, Japan

[21] Appl. No.: 910,863

[22] Filed: Sep. 24, 1986

Related U.S. Application Data

[63] Continuation of Ser. No. 697,013, Jan. 31, 1985, abandoned.

[30] Foreign Application Priority Data

Jan. 31, 1984 [JP] Japan .................................. 59-17396

[51] Int. Cl.4 ............................................... G03B 27/52

[52] U.S. Cl. .................................... 355/55; 355/14 R

[58] Field of Search .................... 355/55, 56, 14 R, 59, 355/14 E

[56] References Cited

U.S. PATENT DOCUMENTS 4,126,389 11/1978 Ikeda et al. ........................ 355/55 X 4,302,098 11/1981 Kan et al. .............................. 355/55

4,332,464 6/1982 Bartulis et al. .................... 355/14 C 4,505,579 3/1985 Furuichi ................................ 355/55

4,582,417 4/1986 Yagasaki et al. .................. 355/14 E

*Primary Examiner*—L. T. Hix

*Assistant Examiner*—D. Rutledge

*Attorney, Agent, or Firm*—Birch, Stewart, Kolasch & Birch

[57] ABSTRACT

Disclosed is a variable-magnification copying machine which provides means for easily performing copying operations using variable magnifications against the desired copying paper from either a standard or an off-standard size draft paper.

The preferred embodiment provides means for automatically setting the magnification by first manually inputting data denoting the length of the horizontal and vertical edges of the draft paper, followed by computing the ratio between the horizontal and vertical lengths by applying the input length data of the draft paper and the preset size of the available copying paper so that the smaller ratio produced from the computation can be eventually set as the correct magnification.

4 Claims, 2 Drawing Figures

VARIABLE-MAGNIFICATION COPYING MACHINE WITH AUTOMATIC MAGNIFICATION

This application is a continuation of application Ser. No. 697,013 filed on Jan. 31, 1985, now abandoned.

BACKGROUND OF THE INVENTION

The present invention relates to a variable-magnification copying machine incorporating means for automatically varying the magnification.

Conventionally, there are a variety of electronic photocopying machines that perform not only actual-size copying but also provide variable magnification by either reducing or enlarging the size of the draft pictures. When varying the magnification, only standardized sizes of draft and copy papers have been used. For example, to realize either a reduction or an enlargement, copying is normally done using either B4, A4, or B5 size of papers against A3, B4, A4, or B5 size of copy papers. Normally, when either enlarging or reducing the magnification using the same A or B type papers against the same-size draft papers, either a magnification of 140% or 70% has been applied. Likewise, when either enlarging or reducing the magnification from A type to B type or vice versa, about 120% or 80% of the magnification has been applied. A certain prior art has already proposed such a copying machine not only capable of dealing with the standard-size drafts but also capable of performing a variable-magnification copying against papers of any desired size by freely setting a specific magnification against indefinite size of draft papers. When copying such a draft paper having a specific standard size, any of the standardized magnification rates can be applied. Conversely, if the draft paper is of an off-standard size, the operator cannot determine the adequate magnification. For example, when the content of such a draft paper having a size of 180 mm×160 mm should be copied against A-4 size papers, the operator cannot easily and correctly determine the applicable enlarging or reducing rate at once. Actually, there were many cases in which the operator inadequately set the magnification rate and wasted many copied papers until the desired magnification was eventually set.

Later, another prior art had also proposed such a technique that first detects the size of the draft paper, followed by computing the magnification needed for the copying in reference to the detected draft size and the mounted copying paper to allow the copying machine to automatically set the computed magnification. This technique permits the copying to be easily done against any desired paper. When using such means for detecting the standard size of the draft paper, a simplified mechanism can be applied. Conversely, such means for detecting the off-standard size of the draft paper in both the horizontal and vertical directions unavoidably involves expensive complexity, and as a result, it has no practical advantage.

OBJECT AND SUMMARY OF THE INVENTION

The present invention aims at providing a means for easily enabling a copying of either an standard or the off-standard-size draft paper against copying papers of any desired size by effectively applying variable magnification.

Another object of the present invention is to provide means for setting variable magnification at an extremely inexpensive cost. The typical preferred embodiment related to the variable-magnification copying provides such means described below. First, the length of both the horizontal and vertical edges of the draft paper is manually input via keys. Then, the ratios related to the length of the horizontal and vertical edges are computed by applying the input size data and the predetermined size of the copying paper to eventually cause the smaller ratio read from the computation to be set as the correct magnification.

DETAILED DESCRIPTION OF THE PREFERRED EMBODIMENT

Figure 1:
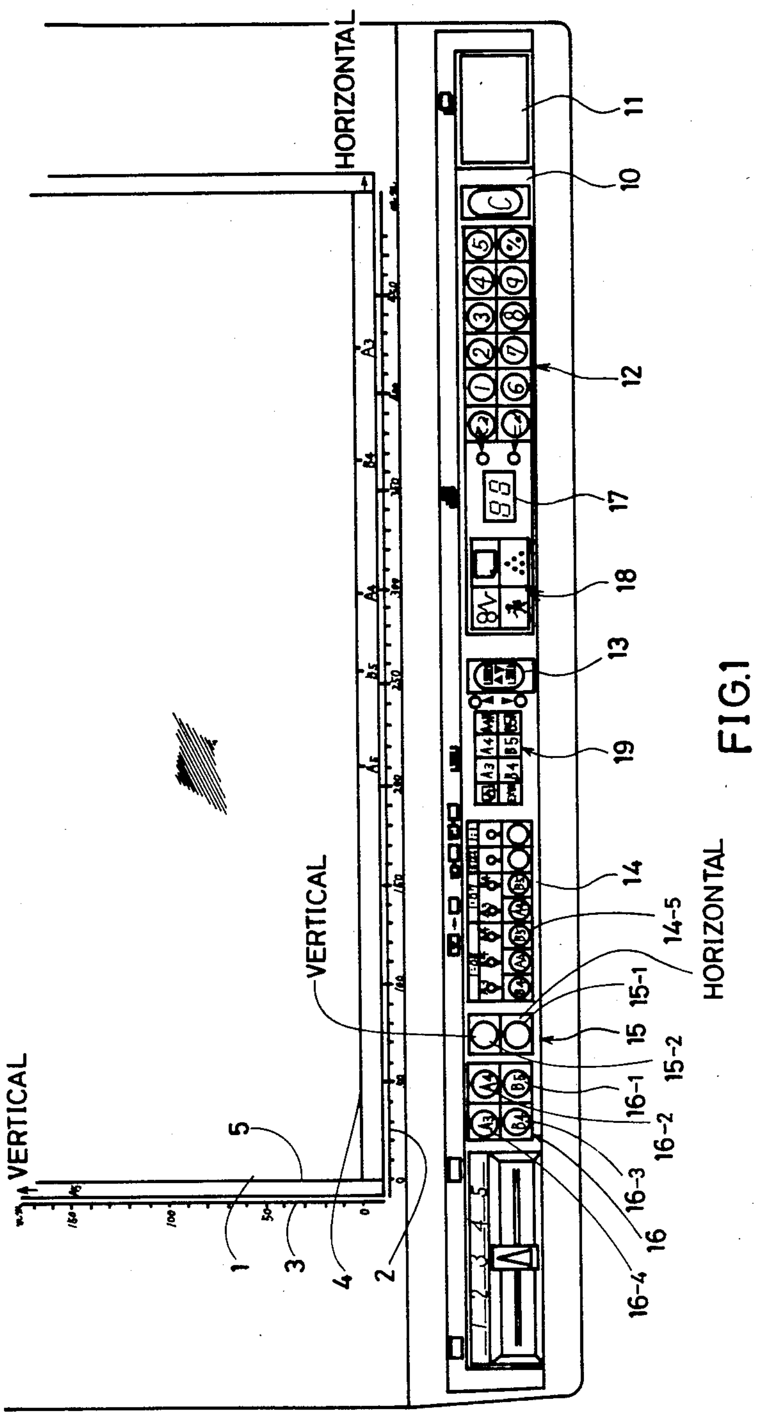
FIG. 1 is a plain view of the operation panel of the copying machine incorporating means for setting the correct magnification embodied by the present invention.

Referring now to the attached drawings, the preferred embodiment of the present invention is described below. FIG. 1 is a plain view of the operation panel of the copying machine provided with the draft mount base reflecting the preferred embodiment. In FIG. 1, reference number 1 indicates the transparent draft mount base for mounting the draft paper. Reference numbers 2 and 3 respectively indicate the scales for measuring the length of both the horizontal and vertical edges of the draft paper. Reference numbers 4 and 5 respectively indicate the basic positions for aligning the horizontal and vertical edges of the draft paper in position. A copying operation can be performed by correctly setting the draft paper in position along the basic aligning position. In this description, the draft paper is set with its long-side aligned with the horizontal basic edge line 4. Reference number 10 indicates the print switch activating the copying operation. Reference number 12 indicates the ten digital keys used for the entry of the needed number of copying paper or the length of either the horizontal or vertical edge. Reference number 13 indicates the paper select key used for selecting the cassette mounted on the paper feeder set to the upper part of the copying machine. Reference number 14 indicates the key for selecting and setting the designated magnification. Reference number 15 indicates the key needed for the entry of the length of either the horizontal or vertical edge of the draft paper, and reference number 16 indicates the size-entry key used for the entry of the desired size of the copying paper. In addition to these, such means for displaying the status of the copying machine or data activated by the functional keys is also provided. It includes display 17 displaying the number of the copied papers, display 18 displaying the internal condition of the copying machine, and display 19 displaying the size of the selector paper. With an A4 standard draft paper on the draft mount base 1 of the copying machine provided with those functional keys and displays described above, when a copy is needed using magnification to reduce it to B5 size, operating the key 14-5 (dealing with the A4-to-B5 mode) provides 80% size against that of the magnification-select key 14, and an optical lens is set to a specific position corresponding to the designated magnification. As a result, the B5 standard copying paper is automatically fed to position. For example, if the copying machine is already provided with a cassette containing the B5 standard copying paper, this cassette is automatically selected. Then, as is normally done by any of the conventional copying machines, by operating print switch 10, the designated picture can be copied onto B5 standard copying paper using 80% magnification. The method of executing a copying operation using variable magnification against an off-standard size draft paper is described below.

First, an off-standard size draft paper is set onto the draft mount base 1. Then, the length of either the horizontal or vertical edge line of the draft paper is read by using scales 2 and 3. Next, the length of the horizontal or vertical edge line read by scales 2 and 3 is input by pressing the lateral input key 15-1 and the digital ten key 12, then the read-out data "a" is stored in the first register that stores the data related to the horizontal length. The first register holds a specific area of RAM of the microcomputer composed of an LSI element, while this area is designated by the operation of the lateral input key 15-1 to allow entry of data "a". Then, the longitudinal key 15-2 is operated to allow entry of the data denoting the vertical length of the draft paper via the digital ten keys 12. Finally the data denoting the longitudinal length of the draft paper is stored in the second register which also occupies a specific area of RAM of the microcomputer composed of an LSI element. Next, by operating the size-select keys 16, copying paper of the desired size is selected. The size-select keys 16-1 through 16-4 are respectively provided to deal with copying paper of specific standard sizes. Therefore, those paper of a specific standard size have a specific length along both the horizontal and vertical edge lines. As a result, by operating any of the designated size-select keys 16-1 through 16-4, the ratio between the already input horizontal and vertical lengths of the draft paper can be computed. In other words, using a conventionally known operation circuit, a division $x \div a$ is executed, in which data "a" denotes the horizontal length stored in the first register and data "x" denotes the horizontal length of the selected copying paper. Likewise, using the same operation circuit, a division $y \div b$ is also executed, in which data "b" denotes the vertical length stored in the second register and data "y" denotes the vertical length of the selected copying paper. Data x and y are both preliminarily stored in the memory according to the size of the copying paper. By operating the size-select key 16, data x and y denoting the horizontal and vertical lengths of the desired copying paper are both delivered to the third and fourth registers set against the first and second registers. After completing transfer of data x and y, data a and x stored in the first and third registers or data b and y stored in the second and fourth registers are delivered to the operation circuit where division for this data is respectively executed. Data y and x denoting the computed ratio (magnification) in the horizontal and vertical directions is stored in the fifth and sixth registers. The fifth register stores the horizonal direction magnification data x, whereas the sixth register stores the vertical direction magnification data y. If data x and y are both greater than 1, it indicates the enlarged magnification. If these are both smaller than 1, it indicates reduced magnification. If a value 1.0 is indicated, then copying in the actual size can be performed. After completing those procedures, data x and y in the fifth and sixth registers are compared to each other. The comparator output goes "High" when $X<Y$, allowing data x stored in the fifth register to be delivered to the optical lens driver, which then sets the optical lens to a specific position corresponding to the data x magnification. Since the method of setting the optical lens to a specific position in response to the applied magnification is well known, details of this movement are deleted. A certain copying machine provides means for performing the copying by applying stepless variable magnification with a zoom lens. In the preferred embodiment of the present invention, the print switch 11 becomes operative by activating the variable magnification in response to the input of the magnification data x. As a result, copying using variable magnification can be executed. The size-select key 16 selects the specific copying paper size to be made available. When the comparator output goes "Low", the variable magnification data y stored in the sixth register is delivered to the optical lens driver, and as a result, the optical lens is set to a specific magnification that matches data y. The preferred embodiment allows the magnification to be automatically set by using either data x or y, whichever is smaller because if one is used, whichever is greater, the draft picture may not be fully reproduced onto the selectively supplied copying paper.

Figure 2:
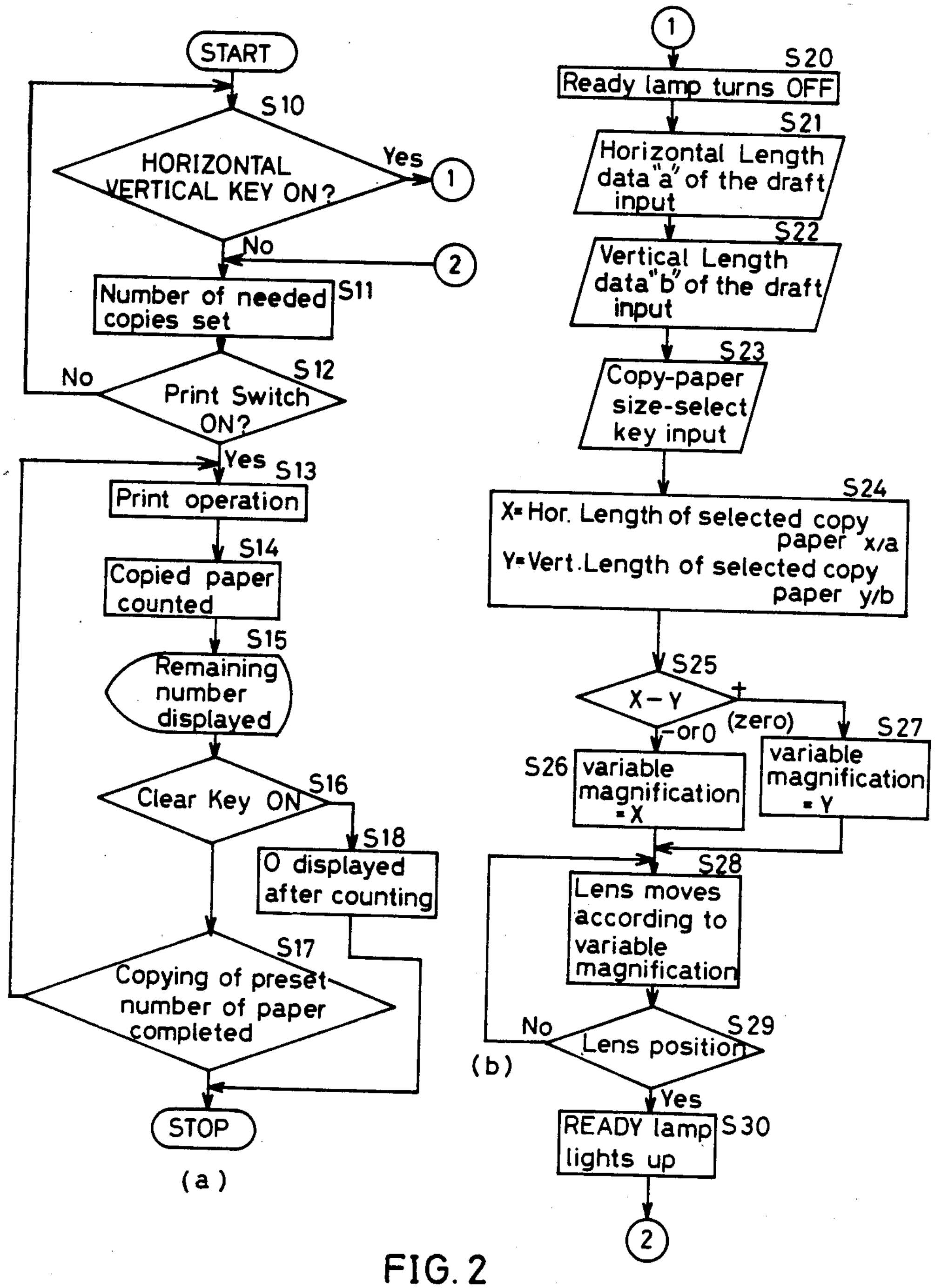
FIGS. 2(*a*) and (*b*) are respectively the flowcharts describing the control procedure needed for setting the correct magnification embodied by the present invention.

FIGS. 2(*a*) and (*b*) respectively denote the flowcharts describing the control procedures for setting the variable magnification thus far described. FIG. 2(*a*) shows the normal copying procedure, whereas (*b*) shows the control procedure for automatically setting variable magnification when copying the content of an off-standard size draft paper onto copying paper of the desired size by employing the preferred embodiment of the present invention.

When the key 15 that selects the length of either the horizontal or vertical edge is operated for executing a variable-magnification copying while the copying machine stands by, the operative status of the select key 15 is checked by step S10 shown in FIG. 2(*a*), thus allowing step S20 of FIG. 2(*b*) to be entered. Step S20 causes the ready lamp indicating the copy-enable status to turn itself off. While steps S21, S22, and S23 are ON, data "a" and "b", denoting the length of the horizontal and vertical edges of the draft paper, and data "x" and "y", denoting the size of the selected copying paper, are both entered. When the operation mode enters step S24, ratio data X and Y, denoting the horizontal and vertical length needed for executing the copying, are computed which are then compared to each other during step S25 so that the smaller ratio can be selected between both data. If the X-Y comparison produces a positive result, data Y is determined to be smaller, thus causing data Y to be set as the correct magnification during step S27. Conversely, if the comparison produces a negative result, data X is determined to be smaller, thus causing data X to be set as the correct magnification during step S26. As a result, after the comparison is made during step S25, either data X or Y, whichever is smaller, is delivered to the optical lens driver as the correct magnification, thus eventually setting the magnification that correctly matches the desired size of the copying paper during step S28. After the magnification has been correctly set, the ready lamp lights up and then the printing can be executed by pressing the print switch 11 (step S12).

The above description relates to the case of setting the magnification when applying an off-standard size draft paper. It is clear from the above that such magnifications reflecting the preferred embodiment can also be set when using draft paper having a standard size such as A4 or B5. As shown in FIG. 1, to measure the lengths of the draft paper, scales 2 and 3 are provided in the horizontal and vertical directions of the mounted draft paper. Since the provision of these scales aims at simplifying the measurement operation, these may be replaced by any other adequate means to facilitate entry of data related to the length of the draft paper by measuring it before mounting the draft paper in position.

The preferred embodiment of the present invention provides means for automatically inputting data denoting the length of the horizontal and vertical edges of the draft paper before computing the ratio of this data against the length of the copying paper, thus securely allowing the correct magnification to be automatically set using extremely simplified means and eliminating such operations otherwise needed for selecting the desired magnification. In addition, the smaller ratio of the horizontal and vertical ratios, is used for the magnification for executing variable-magnification copying against copying paper, thus ensuring copying of the entire area of the draft content without causing any waste or incorrect copying to occur throughout the copying service.

What is claimed is:

1. A variable-magnification copying machine incorporating functions for executing a copying operation in response to a magnification set for selected copy paper sizes as compared to a draft paper of a given size comprising:

orthogonally disposed scales adapted for visually measuring the length of the horizontal and vertical edges of the draft paper and further adapted for indicating a correspondence between the size of the draft paper and one of a plurality of standard draft paper sizes;

key input means for inputting data denoting the length of the horizontal and vertical edges of the draft paper as visually measured along said orthogonally disposed means in a variable sizing mode and alternatively for inputting one of a plurality of standard draft paper sizes in a preset sizing mode;

means for selecting a copy paper size in said variable sizing mode;

calculating means, responsive to said key input means and said means for selecting a copy paper size, for computing a ratio between the inputted lengths of the horizontal and vertical edges of both the draft and copy papers in said variable sizing mode;

said calculating means alternatively computing a ratio between the inputted standard draft paper size and a selected copy paper size in said preset sizing mode;

selecting means, responsive to said calculating means, for selecting the smaller ratio of the computed lengths of the horizontal and vertical edges as the variable magnification in either of said variable sizing mode or said preset sizing mode; and automatic setting means, responsive to said selecting means, for setting a copying magnification for the copying operation.

2. The variable-magnification copy machine of claim 1 further comprising:

storage means for storing said inputted data associated with said draft paper;

second storage means for storing information concerned with the chosen size of said copy paper; and third storage means for storing the ratios computed by said calculating means.

3. A variable-magnification copying machine incorporating functions for executing a copying operation in response to an automatically set magnification for selected copy paper sizes as compared to a draft paper of a given size comprising:

orthogonally disposed scales positioned on a draft table of said copying machine for enabling a measurement of the length of the horizontal and vertical edges of the draft paper, whereby an operator visually measures the draft paper to corresponding incremental indicia and to indicia representing possible standard draft paper sizes on said orthogonally disposed scales;

key input means for inputting data denoting the length of the horizontal and vertical edges of the draft paper as visually measured along said orthogonally disposed means by the operator in a variable sizing mode and alternatively for inputting one of a plurality of standard draft paper sizes in a preset sizing mode;

means for selecting a desired copy paper size on which an image of the measured draft paper will be reproduced;

calculating means, responsive to said key input means and said means for selecting, for computing a first ratio of the horizontal length of said selected copy paper to the horizontal length of said input draft paper data and for computing a second ratio of the vertical length of said selected copy paper to the vertical length of said input draft paper data in either of said preset or variable sizing modes;

said calculating means being further for subtracting said second ratio from said first ratio;

means for determining a magnification ratio based upon said first and second ratios, wherein said second ratio is selected as the magnification ratio if said first ratio is greater than or equal to said second ratio, said first ratio being otherwise selected; and means for automatically setting said magnification in response to said means for determining.

4. The variable-magnification copying machine according to claim 1, wherein said key input means is also utilized to input a number of copies desired.

* * * * *